United States Patent
Gold

(10) Patent No.: US 11,642,725 B2
(45) Date of Patent: May 9, 2023

(54) METHOD FOR CALIBRATING LASER ADDITIVE MANUFACTURING PROCESS

(71) Applicant: GENERAL ELECTRIC COMPANY, Schenectady, NY (US)

(72) Inventor: Scott Alan Gold, Cincinnati, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1068 days.

(21) Appl. No.: 15/001,050

(22) Filed: Jan. 19, 2016

(65) Prior Publication Data

US 2017/0203512 A1 Jul. 20, 2017

(51) Int. Cl.
| | |
|---|---|
| *B33Y 50/02* | (2015.01) |
| *B33Y 10/00* | (2015.01) |
| *B29C 64/153* | (2017.01) |
| *B22F 10/28* | (2021.01) |
| *B22F 12/90* | (2021.01) |
| *B22F 10/31* | (2021.01) |
| *B22F 10/366* | (2021.01) |

(52) U.S. Cl.
CPC .............. *B22F 12/90* (2021.01); *B22F 10/28* (2021.01); *B22F 10/31* (2021.01); *B22F 10/366* (2021.01); *B29C 64/153* (2017.08); *B33Y 10/00* (2014.12); *B33Y 50/02* (2014.12); *Y02P 10/25* (2015.11)

(58) Field of Classification Search
CPC ... B29C 64/153; B29C 64/386; B29C 64/393; B33Y 50/02
See application file for complete search history.

(56) References Cited

U.S. PATENT DOCUMENTS

| | | | |
|---|---|---|---|
| 4,863,538 | A | 9/1989 | Deckard |
| 5,104,592 | A | 4/1992 | Hull et al. |
| 5,430,666 | A | 7/1995 | DeAngelis et al. |
| 5,460,758 | A | 10/1995 | Langer et al. |
| 6,501,061 | B1 | 12/2002 | Kitai et al. |
| 6,930,278 | B1 | 8/2005 | Chung et al. |
| 8,288,679 | B2 | 10/2012 | Unrath |
| 8,404,998 | B2 | 3/2013 | Unrath et al. |
| 10,118,341 | B1* | 11/2018 | Liu ........................ B29C 64/393 |
| 2004/0026807 | A1 | 2/2004 | Andersson et al. |
| 2004/0254665 | A1 | 12/2004 | Fink et al. |
| 2009/0206065 | A1* | 8/2009 | Kruth .................... B29C 64/153 |
| | | | 219/121.66 |

(Continued)

FOREIGN PATENT DOCUMENTS

| | | |
|---|---|---|
| DE | 10 2013 208 651 A1 | 11/2014 |
| JP | H04-506039 A | 10/1992 |

(Continued)

OTHER PUBLICATIONS

Gibson, I.; Rosen, D.; Stacker, B. Additive Manafactaring Technologies, 2nd edition (2015) Springer Science and Business Media: New York. pp. 107-145. (Year: 2015).*

(Continued)

*Primary Examiner* — Duane Smith

(74) *Attorney, Agent, or Firm* — Dority & Manning, P.A.

(57) ABSTRACT

This invention relates to a method for calibrating the delay settings of a laser or scanner head in a laser additive manufacturing process. More particularly, the invention relates to calibrating delay settings during run-ins and run-outs of a laser scanning process.

17 Claims, 6 Drawing Sheets

(56) References Cited

U.S. PATENT DOCUMENTS

| | | | |
|---|---|---|---|
| 2014/0052288 A1* | 2/2014 | El-Siblani | G05B 19/042 700/119 |
| 2014/0275317 A1* | 9/2014 | Moussa | C09D 133/08 522/72 |
| 2015/0100149 A1 | 4/2015 | Coeck et al. | |
| 2015/0147424 A1* | 5/2015 | Bibas | B33Y 30/00 425/150 |
| 2015/0375456 A1* | 12/2015 | Cheverton | B29C 64/153 264/406 |
| 2016/0059493 A1* | 3/2016 | Sparks | G05B 19/4099 700/98 |
| 2016/0082668 A1 | 3/2016 | Perret et al. | |

FOREIGN PATENT DOCUMENTS

| | | |
|---|---|---|
| JP | 2002-210835 A | 7/2002 |
| JP | 2008-162189 A | 7/2008 |
| JP | 2010-173123 A | 8/2010 |
| WO | WO-2017158327 A * | 9/2017 |

OTHER PUBLICATIONS

Moylan, S.; Slotwinski, J.; Cooke, A.; Jarrens, K.; Donmez, M.A. "An Additive Manafactaring Test Artifact" Joarnal of Research of the National Institute of Standards and Technology 119 (2014) pp. 429-459. (Year: 2014).*

Lao, X.; Li, J.; Lucas, M. "Galvanometer Scanning Technology for Laser Additive Manafactaring" Proceedings of SPIE (2017) San Francisco, CA. (Year: 2017).*

Machine Translation and Notification of Reasons for Refusal issued in connection with corresponding JP Application No. 2017-006379 dated Apr. 10, 2018.

"Image Processing Toolbox," Retrieved from the Internet URL: www.mathworks.com/help/images/ref/fitgotrans.html, on Jul. 11, 2017, pp. 1-1.

"Laser Scanners," Retrieved from the Internet URL: www.zamisel.com/SSpostavka2.html, on Jul. 11, 2017, pp. 1-4.

Extended European Search Report and Opinion issued in connection with corresponding EP Application No. 17151904.4 dated Jul. 4, 2017.

Scanlab, Installation and Operation, The RTC 5 PC Interface Board, RTC 5-Express Board, RTC 5 PC/104-Plus Board and RTC 5 PCIe/104 board for Real Time Control of Scan Heads and Lasers, 7 Basic Functions for Scan Head and Laser Control, 7.2. Delay Settings for Synchronizing Scan Head and Laser Control, RTC 5 PC Interface Board Rev. 1.7 e, Mar. 28, 2013, pp. 95-113.

Wen et al., Study on key technology for 3-D galvanometric scanners, Laser Technology, vol. 33, No. 4, Aug. 31, 2009, pp. 377-390. (Abstract Only).

* cited by examiner

METHOD FOR CALIBRATING LASER ADDITIVE MANUFACTURING PROCESS

INTRODUCTION

This invention is in the field of laser-based additive manufacturing processes for fabricating objects. In particular, the invention relates to a process of calibrating laser and scanner delays, in particular laser scan starts and stops, during the build process. The novel calibration process will reduce operator variation and standardize the scanning process leading to more accurate fabrication of complex geometric objects.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. No. 4,863,538 and U.S. Pat. No. 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional laser additive manufacturing system 100. The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern or "mark" for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress relief process. Additionally, thermal, mechanical, and chemical post processing procedures can be used to finish the part 122.

The scan or mark of the laser across the powder material is done, for example, in a raster scan fashion to create hatch scans, which form the bulk of a part cross section, and/or contours scans, which outline the edges of the parts cross section, melting powder in that region while being switched off where melt formation of the object's cross section in that layer is not desired. These hatch scans are repeated along adjacent lines to form a single melted and fused cross section of the object to be built, while the contour scans create a discrete border or edge of the part. Once the melt formation of one cross section of the object being built is completed, the apparatus coats the completed cross-sectional surface with an additional layer of powder. The process is repeated until the object is complete.

One challenge associated with laser additive manufacturing involves producing a desired melt pattern in the powder while maintaining desired speed of the laser over the powder bed. Inaccuracies in the melt pattern result, for example, when the laser is turned on too early or late at the beginning of a hatch line or off to early or late at the end of a hatch line. When the apparatus is run in mark mode, where the laser head is stopped at the beginning and end of a hatch line, turning the laser on too early may result in a burn-in effect where the melt pool is larger than desired at the beginning of a hatch. In a skywriting mode, where the laser head remains in constant motion at the end of writing stages, turning the laser on too early may result in a hatch line that overshoots a contour line. Other non-uniformities result from turning the laser on too early or late, or turning the laser on too late. Also, because the laser head is unstable after a jump, turning the laser on too early after a jump can result in a distorted melt pattern reflecting the dynamic instability of the laser write head. These problems can result in a non-uniform surface of the object being built.

To correct these issues, lasers and scanner head control signals must be adjusted to account for the dynamic behavior of the system components (i.e., the response of the scanners and the laser, and the specific interaction between the work piece and laser irradiation). One control scheme uses set parameters including a laser-on delay, laser-off delay, jump delay, mark delay, or polygon delay. See 7 Basic Functions for Scan Head and Laser Control, Rev. 1.7e RTC® 5 PC Interface Board. In the skywriting mode, set parameters are used to control the duration of the run-in, duration of the run-out, the time lag and laser on shift parameters that define the delay of the "laser active" laser control signals' switch-on and switch-off time points relative to the set starting position and set ending position.

FIG. 2 is a representative delay setting for a laser, such as in a skywriting process. In FIG. 2, the angular velocity of the mirror moves the laser at a constant velocity developing a hatch scan (1), the laser is turned off and the mirrors decelerate to stop, reverse direction, and reaccelerate to being the next hatch scan (2), the laser is turned back on and the mirrors again held at a constant velocity to initiate the next hatch scan (3), and the laser is moving at a constant velocity developing a hatch scan (4). The decelerations associated with (2) are often termed a run-out motion, while the accelerations associated with (3) are often termed run-in motions. If a delay setting, such as in a skywriting process, is activated, the mirror is accelerated before the start of the weld and allows for heat to build up and initiate a new melt. The same is true for the end of the part, where the mirror is decelerated at the end of the weld and the laser is turned off before reaching inside edge of part and the melt pool leads the focal point.

One way to ensure accuracy in the of the laser or scanner head during run-ins and run-outs is to calibrate the delay settings in the laser additive manufacturing apparatus. Currently, calibrating the delay settings in a laser additive manufacturing apparatus is largely a manual procedure requiring a skilled operator to interpret whether the marks created by the laser conform to the designated start and stop coordinates. For example, in FIG. 3, a skilled operator creates a test pattern by marking a metal plate with the laser of an additive manufacture apparatus and photographs the resulting pattern. The skilled operator creates both a contour scan and hatch scans and reviews the scans for proper overlap at the intersection between the contour and hatch scans. One method of reviewing the proper delay setting is to examine the test pattern by microscopically inspecting the test pattern, such as in FIG. 4. Where there is misalignment of the scans, the operator would subsequently adjust the delay settings, such as for example in a skywriting writing process, such that the run-ins and run-outs start and stop the laser at the appropriate coordinates. Operators manual adjust the delay settings through trial and error, and this adjustment introduces a great deal of variability from each session of part manufacturing. The variability leads to uneven surface finishes, indentations, over-welding and/or under welding. As laser additive manufacturing is industrialized and more operators are involved in the process, operator-to-operator variation is likely to become a challenge and significantly more man-hours will be required for this calibration process. The inventors recognized the need to increase efficiencies and to have improved methods of calibrating delay settings on laser additive manufacturing processes.

Thus, there is a need to improve the method of calibrating the delay settings associated with the starting and stopping of laser and scanner heads during the melting and fusion processes in laser additive manufacturing processes. By improving the process of calibrating the delay settings in a laser and scanner head, or the scan motions of the laser or scanner head, during a laser additive manufacturing process, less variation in part deformities will result.

BRIEF DESCRIPTION OF THE INVENTION

The present invention relates to a method of calibrating the delay and/or skywriting acceleration and deceleration settings of a laser scanner in a laser additive manufacturing process, the method comprising comparing the on and off laser positions on a test plate to the laser on and off positions on a control or standard. Any differences found in the test plate are adjusted such that the on and off laser positions of the test plate are substantially identical to those of the control or standard.

DETAILED DESCRIPTION OF VARIOUS EMBODIMENTS OF THE INVENTION

Figure 1:
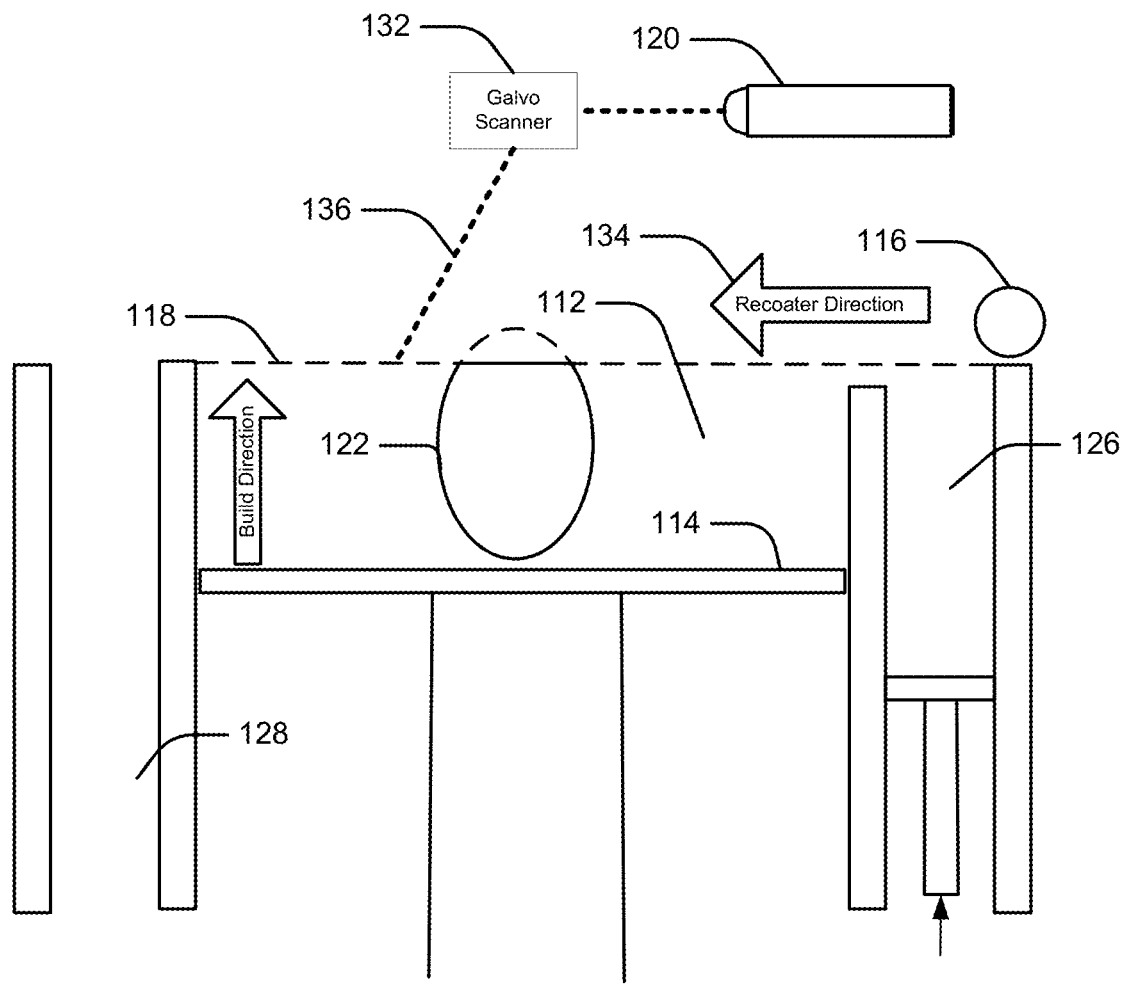
FIG. 1 is a schematic view of a conventional laser additive manufacturing apparatus. a laser additive manufacturing process diagramming the melt pool and the path and speed with which the laser moves during the manufacturing process.
Figure 2:
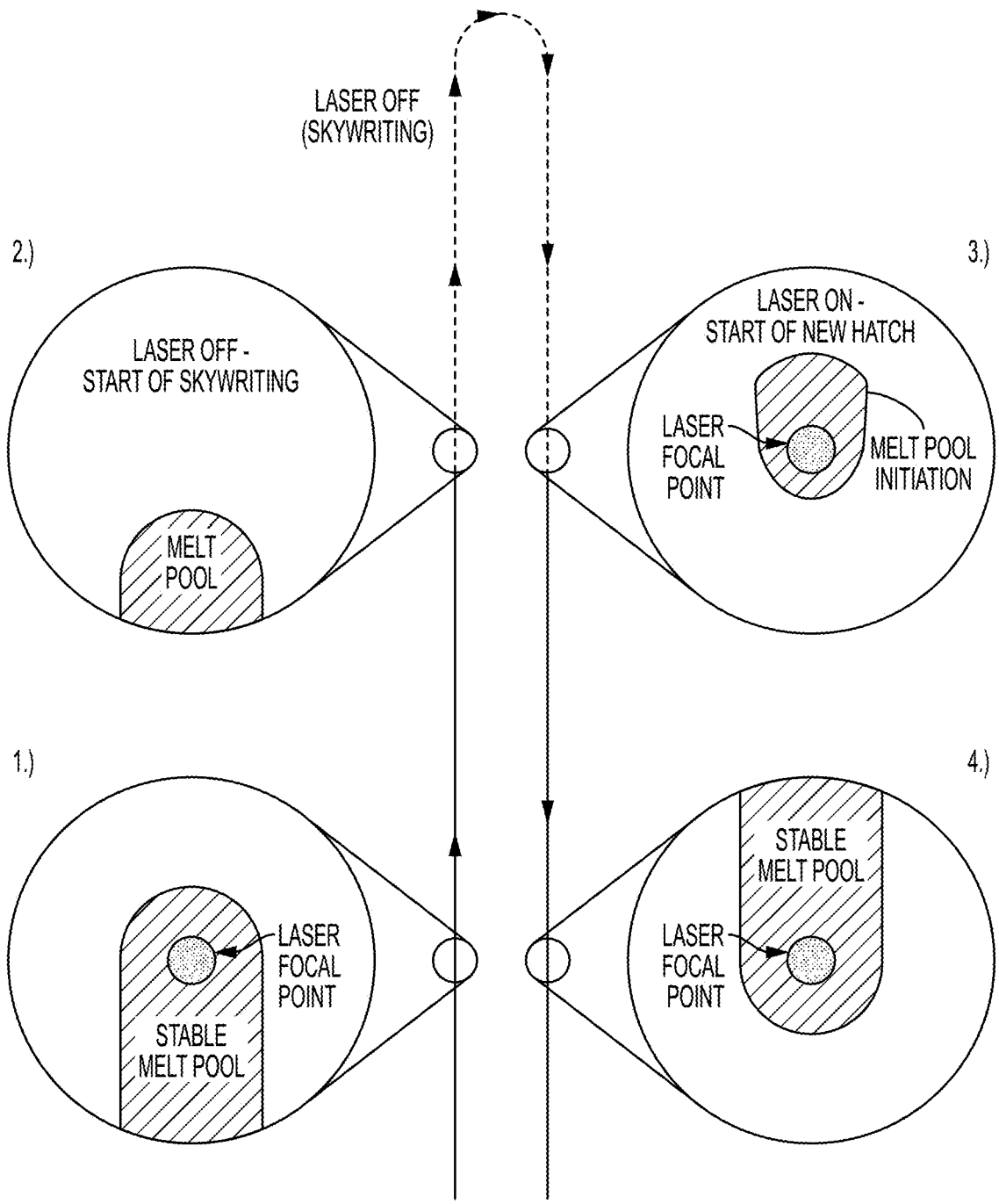
FIG. 2 is a schematic representation of a motion of a laser during a laser additive manufacturing scan of an object, which diagrams the melt pool and the path and velocity with the which the laser moves during the manufacturing process.
Figure 3:
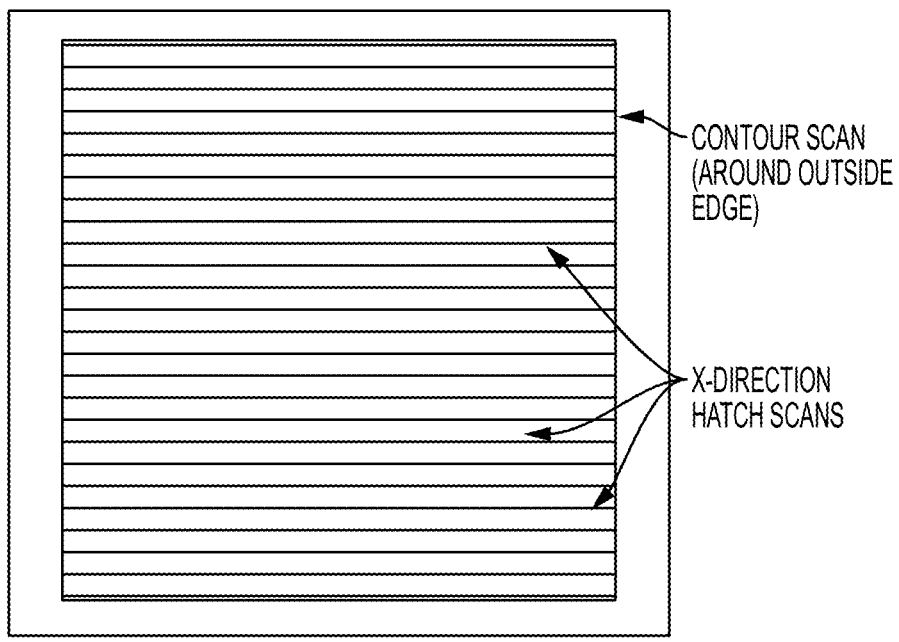
FIG. 3, is a view of a test pattern on a melt plate showing the hatch scans in the x-dimension and the accuracy of the laser additive process at the contour scan.

The following detailed description sets forth a method of calibrating the delay setting motions of a laser or scanner head, such as during a skywriting process, a jump delay, mark delay, or polygonal delay process, during a laser additive manufacturing process. The description should clearly enable one of skill in the art to use the method, and the description sets forth several embodiments, adaptations, variations, alternatives, and uses of the method, including what is presently believed to be the best mode thereof. While the described method is being described as being performed on one particular type of laser additive manufacturing process, it is contemplated that this calibration method is broadly applicable to other additive manufacturing processes that utilize the skywriting process to control the switching on or off and scanning of a high energy beam during an additive manufacturing process.

In one embodiment, the invention relates to a method for calibrating a skywriting process by comparing the laser or scanner head motions to a known test pattern and adjusting the laser and scanner head delay settings to match those of a known quality build of a particular part or object made in a laser additive manufacturing process. If differences exist, the system or the operator will adjust key process parameters such that the test patterns match those of a standard or quality control build. Once calibrated, there is reduced variability in subsequent builds, such that the motions of the laser and scanner heads match those of known quality builds. In alternate embodiment, the process of calibration may be automated such that any differences between the test pattern and the quality control build can be automatically adjusted until the test pattern is identical in specification to the control build. The automatic adjustment may also be performed through a process feedback mechanism.

In another embodiment of the claim, the invention relates to a method for calibrating the delay settings of a laser scanner for laser additive manufacturing. The method, in one embodiment is accomplished by performing a test build where key process parameters are determined. Examples of key process parameters include, but not limited to, contour and hatch scans. During the test build, the laser focus point is simultaneously monitored, such that the start and stop points of the location of the laser focal point. By comparing the locations of the laser focal point and its associated melt pool when the laser is turned off and subsequently turned on, the process is able to remove the user error associated with the test build to locations for a known good test build and using this comparison in conjunction with an empirical formula or chart to adjust the process parameters.

In yet another embodiment, the invention relates to a method for calibrating a laser additive manufacturing process comprising irradiating a layer of powder in a powder bed to form a fused region pattern, comparing a first characteristic of the fused region pattern to a second characteristic of a reference pattern, and adjusting a first parameter based on the comparison so that repetition of irradiating a layer of powder in a powder bed would result in a second fused region pattern that more closely matches the reference pattern. The first parameter, in one embodiment may relate to a scan motion of a skywriting process, or to a scan motion of a jump delay, mark delay, or polygonal delay setting. The scan motions may be a run-in motion, a run-out motion, or a jump motion. In alternative embodiment, the first parameter may relate to the synchronization between a scan motion and control of an irradiation source for performing the irradiation step. In yet another embodiment, the parameter may include the duration of the run-in motion, or the duration of the run-out motion. The parameter may also include the distance between the contour and hatch line, or the distance between the contour orthogonal to the hatch line, or adjusting the laser on delay, or adjusting the laser off delay, or any combination thereof. In one aspect, the first characteristic is a first distance between the end of the hatch scan and the contour scan or is an optical image stored on a form of electronic storage device, or is compared by measuring laser galvanometer drive voltage. In still another embodiment, the pattern is a hatch mark, scan, or line. The method may further comprising repeating step irradiating after the adjustments are made to complete an object. Finally, the embodiments described above may be automated process.

In yet another embodiment, the invention relates to a software program for performing the comparing of a first characteristic of the fused region pattern to a second characteristic of a reference pattern, where the program may also further automatically performs the parameter adjustments.

In a final embodiment, the invention relates to a system comprising a laser additive manufacturing device, a monitoring device, a computer, and software integrated together to adjust laser scanner delay settings in the additive manufacturing device, wherein the system compares coordinates at which laser scanning starts and stops during the building of a control build and adjusts at least one key process parameter in a test pattern to match those of the control build.

Those of skill in the art understand that the test pattern can be accomplished in a variety of ways. For example, a metal plate, such as plates made from a hastalloy, stainless steel, nickel, cobalt based super alloys, or aluminum alloys, is burned with a laser, first by burning the contours scan, followed by row-by-row hatch scanning. Those of skill in the art would understand that the test pattern is intended to help in determining whether calibration of the acceleration and/or deceleration of the laser is required. While the laser is burning the test pattern, data on the X and Y positions of the laser, including the starting and stopping points of the laser focal point as well as its associated melt pool, are collected.

Figure 4:
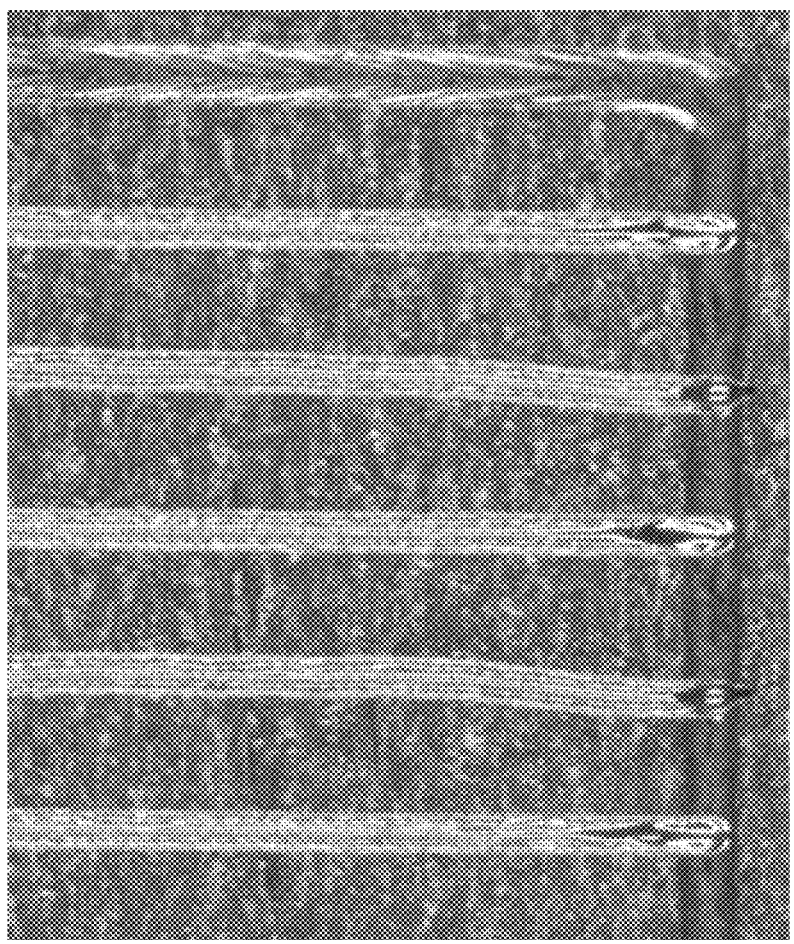
FIG. 4 is a close-up view of FIG. 3 showing the overlap between the contour scan and the hatch scans.

The collection and monitoring of the positional data can be accomplished in several ways. In one aspect of the invention, the monitoring of the location of the laser focal point is done by monitoring the laser galvanometer drive voltage. As shown in FIG. 4, the laser galvanometer (also known as "galvo") drive voltage is measured along the X and Y positions and converted using a known transfer function to positional coordinates. Those of skill in the art will appreciate and understand that the transfer function is standard and can be accomplished using a variety of methods, such as but not limited to those available through MATLAB. The transfer function serves to apply a correction factor given that the voltage is not a 1:1 ratio with the galvanometer. One of skill in the art will appreciate that there are numerous ways to accomplish this correction factor, such that the galvo drive voltages to the physical position of the laser focal point on the build plate (see, e.g., www.zamisel.com/SSpostavka2.html). Some possible transfer functions would include fitgeotrans followed by transformPointsInverse in MatLab. Once the transfer function is applied, the galvo drive voltage along the X and Y positions is converted into X and Y positions (e.g., in millimeters or inches) from the center. See FIG. 4.

Figure 5:
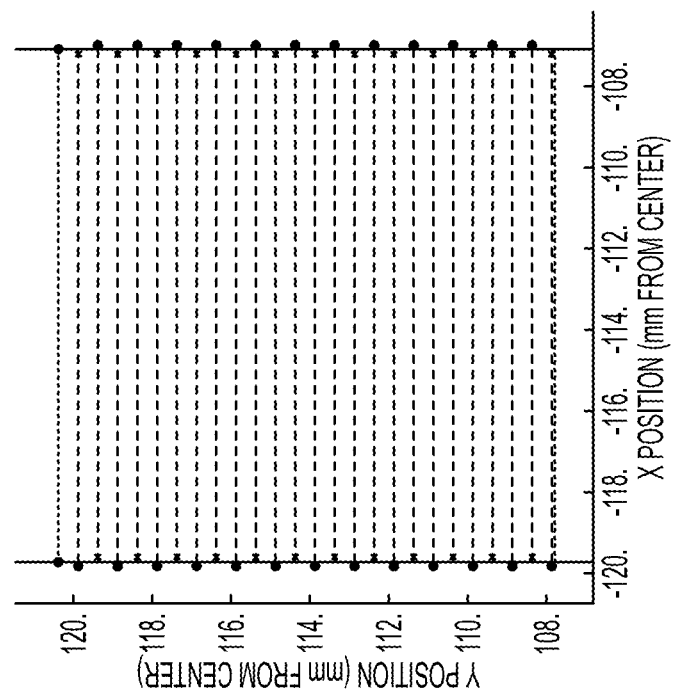
FIG. 5 is a graph showing the conversion of laser galvanometer drive voltage to X and Y positional coordinates.
Figure 5:
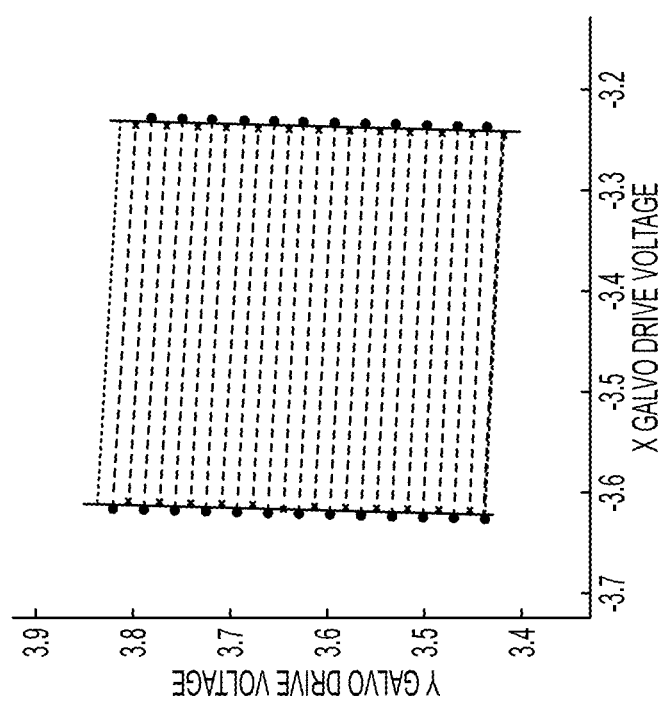
Figure 6:
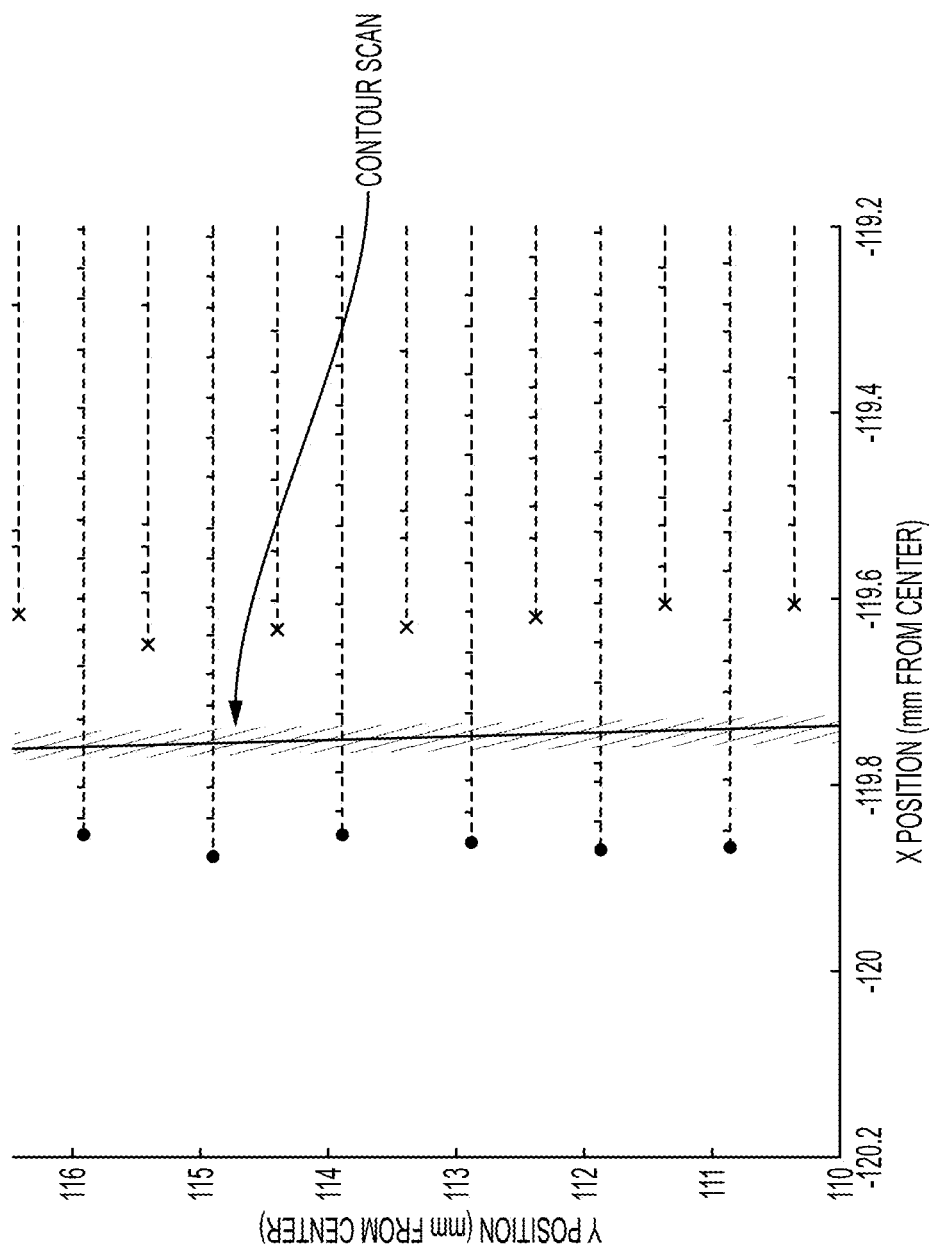
FIG. 6 is a graph showing the X and Y positional coordinates of a skywriting process by using an imaged based determination. Closed circle represents a point in the scan when the laser is turned on, the "x" represents a point in the scan when the laser is turned off.

In another embodiment, the monitoring can be accomplished by use of a camera, such as but not limited to a charged couple device (CCD) camera. The camera, which may also include grid lines, may be used to take time lapse photos of the burn process to monitor the X and Y positions of the laser focal point. FIG. 5 shows the monitoring of a start (closed circles) and stop ("x" mark) of a burn. The average of the positions of each start and stop of the laser is determined, based on the distance from the contour scan and is used to adjust the laser.

Once the monitoring is accomplished, the data collected is used to determine the distance between the end of a scan or vector and the start of a scan or vector, and measured and compared against known controls or standards. Those of skill in the art will understand that the controls or standards are previous prototypes of manufactured parts that have undergone the laser additive manufacturing process and determined to most accurately reflect the precise specifications and measurements of the originally created computer aided design (CAD) model.

Once the monitoring is accomplished, scan motions are based on the collection of the data. Those of skill in the art will appreciate that the adjustments accomplished through this calibration technique provides a means to standardize the laser and scanner head delay settings during, for example, the skywriting process and will result in a more consistent final product.

The various embodiments described in this invention have some of, but not limited to, the following advantages:
1) replaces a manual calibration process;
2) reduces operator-to-operator variation;
3) reduces skywriting calibration time; and
4) reduces process variation, which is critical for meeting geometric tolerance in laser based additive manufacturing parts.

Those of skill in the art will also appreciate that computer software may be implemented such that this analysis can be programmed. In another embodiment, the above described calibration method and its software can be incorporated into laser based additive manufacturing machines. For example, the process and software for the calibration can be integrated into the standard operating software or systems of a laser additive manufacturing machine. Example For the calibration of the skywriting process, a single layer test burn is performed in a DMLM machine by conducting the test pattern burn on a hastalloy plate. During the burn, the laser galvanometer drive signals are monitored and recorded. The recorded voltage readings are converting into positional coordinates along an X and Y plane using the fitgeotrans function available on Matlab (www.mathworks.com/help/images/ref/fitgotrans.html). The function is used to fit the voltage readings to measure positions associated with the voltages by applying fourth order polynomial and linear piecewise fits. The voltages having been converted mathematically are transformed to particular x-y position of the laser focus point on the build surface. While these specific functions are used, one of skill in the art will appreciate that other functions performing the same tasks may also be used. Once created, the transfer function is applied using the transformPointsInverse function in Matlab (www.mathworks.com/help/images/ref/affine3d.transformpointsinverse.html?searchHighlight=transformPointsInverse). Start and stop positions for each pass in the test burn are compared to a known good work pieces Exemplary embodiments of the calibration method are described above in detail. The method are not limited to the specific embodiments described herein. For example, the methods described herein may have other industrial and/or consumer applications and are not limited to practice with laser additive manufacturing processes. Rather, the calibration method can be applied to other additive manufacturing calibration.

While various embodiments of the invention have been described in terms of various specific embodiments, those skilled in the art will appreciate and recognize that the invention can be practiced with modifications within the spirit and scope of the claims.

The invention claimed is:

1. A method for calibrating a laser or scanner head for an additive manufacturing process comprising:
   (a) irradiating a layer of powder in a powder bed utilizing at least one of the laser or scanner head and at least one of a first laser or scanner head delay setting to form a fused region pattern including one or more hatch lines and contour lines,
   (b) generating positional data indicative of the one or more hatch lines and contour lines by collecting and monitoring positional data associated with a laser focal point associated with at least one of the laser or scanner head,
   (c) comparing a a first distance between the end of at least one hatch scan and at least one contour scan represented by the positional data indicative of the one or more hatch lines and contour lines to a second distance between the end of at least one hatch scan and at least one contour scan of a reference pattern,
   (d) adjusting at least one of the first laser or scanner head delay setting to at least one of a second laser or scanner head delay setting different than at least one of the first laser or scanner head delay setting based on the comparison so that repetition of step (a) results in a second fused region pattern that more closely matches the reference pattern,
   (e) spreading an additional layer of powder on the powder bed, and repeating step (a) by irradiating the additional layer of powder on the powder bed utilizing the at least one of the laser or scanner head and the at least one of the second laser or scanner head delay setting,
   wherein steps (e) and (a) are repeated to form an object.

2. The method of claim 1, wherein the at least one of the laser or scanner head delay setting relates to a scan motion of a jump delay, mark delay, or polygonal delay setting of the at least one the laser or scanner head.

3. The method of claim 1, wherein the laser or scanner head delay setting is associated with at least one of a run-in motion or a run-out motion.

4. The method of claim 1, wherein the at least one of the laser or scanner head delay setting relates to the synchronization between a scan motion and control of an irradiation source for performing the irradiation step (a).

5. The method of claim 1, wherein
   step (d) further comprises adjusting a duration of a run-in motion setting utilized to form the fused region pattern in step (a) based on the comparison so that repetition of step (a) results in a second fused region pattern that more closely matches the reference pattern, and
   wherein repeating step (a) further comprises irradiating the additional layer of powder on the powder bed utilizing the adjusted duration of the run-in motion setting.

6. The method of claim 1, wherein
   step (d) further comprises adjusting a duration of a run-out motion setting utilized to form the fused region pattern in step (a) based on the comparison so that repetition of step (a) results in a second fused region pattern that more closely matches the reference pattern, and
   wherein repeating step (a) further comprises irradiating the additional layer of powder on the powder bed utilizing the adjusted duration of the run-out motion setting.

7. The method of claim 1, wherein step (d) further comprises adjusting a laser on delay setting utilized to form the fused region pattern in step (a) based on the comparison so that repetition of step (a) results in a second fused region pattern that more closely matches the reference pattern, and
   wherein repeating step (a) further comprises irradiating the additional layer of powder on the powder bed utilizing the adjusted laser on delay setting.

8. The method of claim 1, wherein step (d) further comprises adjusting a laser off delay setting utilized to form the fused region pattern in step (a) based on the comparison so that repetition of step (a) results in a second fused region pattern that more closely matches the reference pattern, and
   wherein repeating step (a) further comprises irradiating the additional layer of powder on the powder bed utilizing the adjusted laser off delay setting.

9. The method of claim 1, wherein the second distance is represented by an optical image stored on a form of electronic storage device.

10. The method of claim 1, wherein the process is automated.

11. The method of claim 1, wherein (b) generating positional data indicative of the one or more hatch lines and contour lines comprises:
   collecting and monitoring a laser galvanometer drive signal associated with the at least one of the laser or scanner head and indicative of a location of a laser focal point associated with the at least one of the laser or scanner head, and generating positional data indicative of the one or more hatch lines and contour lines from the collected and monitored galvanometer drive signal.

12. The method of claim 11, wherein the laser galvanometer drive signal comprises a laser galvanometer drive voltage.

13. The method of claim 11, wherein generating positional data indicative of the one or more hatch lines and contour lines comprises generating coordinates along an X and Y plane indicative of the one or more hatch lines and contour lines from the collected and monitored galvanometer drive signal.

14. A method for calibrating a laser or scanner head for an additive manufacturing process comprising:

(a) irradiating a layer of powder in a powder bed utilizing at least one of the laser or scanner head and a first scan motion setting of a skywriting process to form a fused region pattern including one or more hatch lines and contour lines, (c) comparing a first distance between the end of at least one hatch scan and at least one contour scan to a second distance between the end of at least one hatch scan and at least one contour scan of a reference pattern, (d) adjusting the first scan motion setting of the skywriting process to a second scan motion setting of the skywriting process different than the first scan motion setting of the skywriting process based on the comparison so that repetition of step (a) results in a second fused region pattern that more closely matches the reference pattern, (e) spreading an additional layer of powder on the powder bed, and repeating step (a) by irradiating the additional layer of powder on the powder bed utilizing the at least one of the laser or scanner head and the second scan motion setting of the skywriting process, wherein steps (e) and (a) are repeated to form an object.

15. The method of claim 14, wherein the first scan motion setting of the skywriting process comprise at least one of a first duration of a run-in motion setting or a first duration of a run-out motion setting, and wherein the second scan motion setting of the skywriting process comprises at least one of a second duration of a run-in motion setting or a second duration of a run-out motion setting different than at least one of the first duration of the run-in motion setting or the first duration of the run-out motion setting.

16. The method of claim 14, wherein the first scan motion setting of the skywriting process comprise at least one of a first laser or scanner head delay setting, and wherein the second scan motion setting of the skywriting process comprises at least one of a second laser or scanner head delay setting different than at least one of the first laser or scanner head delay setting.

17. The method of claim 14, further comprising:

(b) generating positional data indicative of the one or more hatch lines and contour lines by collecting and monitoring positional data associated with a laser focal point associated with at least one of the laser or scanner head, wherein comparing the first distance between the end of at least one hatch scan and at least one contour scan to the second distance between the end of at least one hatch scan and at least one contour scan of a reference pattern comprises comparing the first distance between the end of at least one hatch scan and at least one contour scan represented by the positional data indicative of the one or more hatch lines and contour lines to the second distance between the end of at least one hatch scan and at least one contour scan of a reference pattern.

* * * * *